(12) United States Patent
Halup et al.

(10) Patent No.: US 6,189,452 B1
(45) Date of Patent: *Feb. 20, 2001

(54) APPARATUS FOR LOADING AND UNLOADING PLATES TO EXTERNAL DRUM DEVICES HAVING MOVABLE CLAMPS

(75) Inventors: Nir Halup, Tsoran; Yehuda Barnes Solomon, Rishon Lezion; Moshe Beres, Nes Ziona, all of (IL)

(73) Assignee: Creoscitex Corporation Ltd., Herzlia (IL)

( * ) Notice: Under 35 U.S.C. 154(b), the term of this patent shall be extended for 0 days.

This patent is subject to a terminal disclaimer.

(21) Appl. No.: 09/391,185

(22) Filed: Sep. 7, 1999

Related U.S. Application Data

(63) Continuation-in-part of application No. 09/069,546, filed on Apr. 30, 1998, now Pat. No. 6,003,442.

(51) Int. Cl.$^7$ ...................................................... B41F 27/12
(52) U.S. Cl. ........................ 101/415.1; 101/477; 271/82; 271/277
(58) Field of Search ................................... 101/477, 409, 101/415.1, 378; 271/82, 277

(56) References Cited

U.S. PATENT DOCUMENTS

| | | | |
|---|---|---|---|
| 4,250,810 | * 2/1981 | Fowler et al. | 101/415.1 |
| 5,516,096 | * 5/1996 | Whiteside et al. | 101/409 |
| 5,555,812 | * 9/1996 | Ruckmann et al. | 101/477 |
| 5,709,151 | * 1/1998 | Durr et al. | 101/477 |
| 6,003,442 | * 12/1999 | Solomon et al. | 101/415.1 |

* cited by examiner

Primary Examiner—John S. Hilten
Assistant Examiner—Leslie J. Grohusky
(74) Attorney, Agent, or Firm—Mark M. Friedman

(57) ABSTRACT

A system for loading and clamping one or more plates onto the cylindrical surface of a rotatable drum, such as used in a platesetter for printing, and for unloading the plates from the drum. The system is characterized by clamps that are movable over the surface, preferably along circumferential tracks, enabling the attachment of multiple plates, end-to-end and/or side-by-side, each plate having any of a wide range of sizes. The clamps are preferably of the dynamic type, whereby the clamping force increases with rotational speed. Also disclosed is a method for mounting and unmounting plates, using the movable clamps, such that allows flexible and convenient arrangement of loading- and unloading stations.

11 Claims, 17 Drawing Sheets

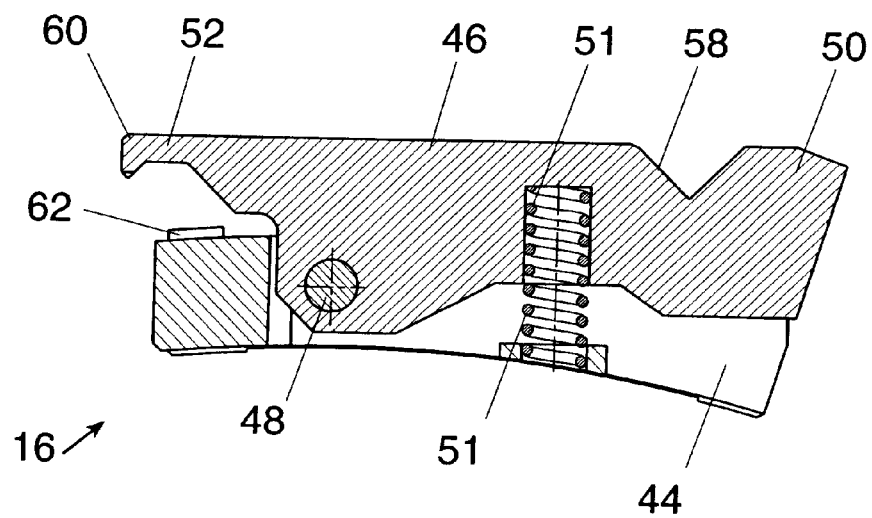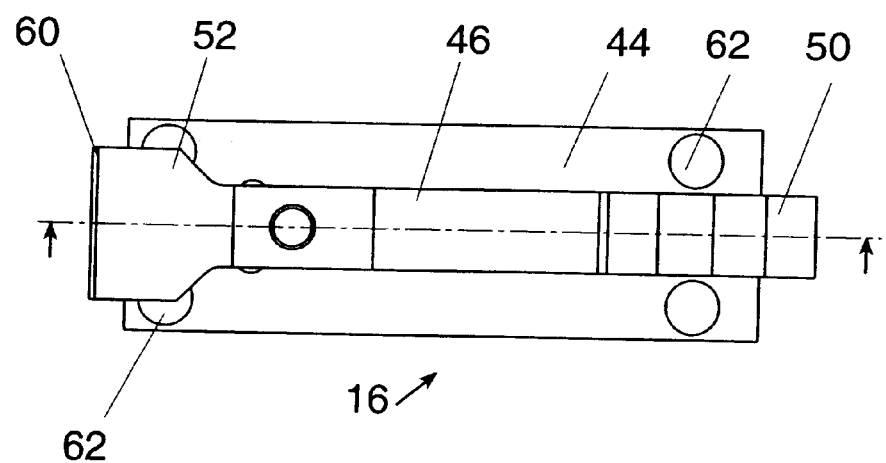
FIG. 4B

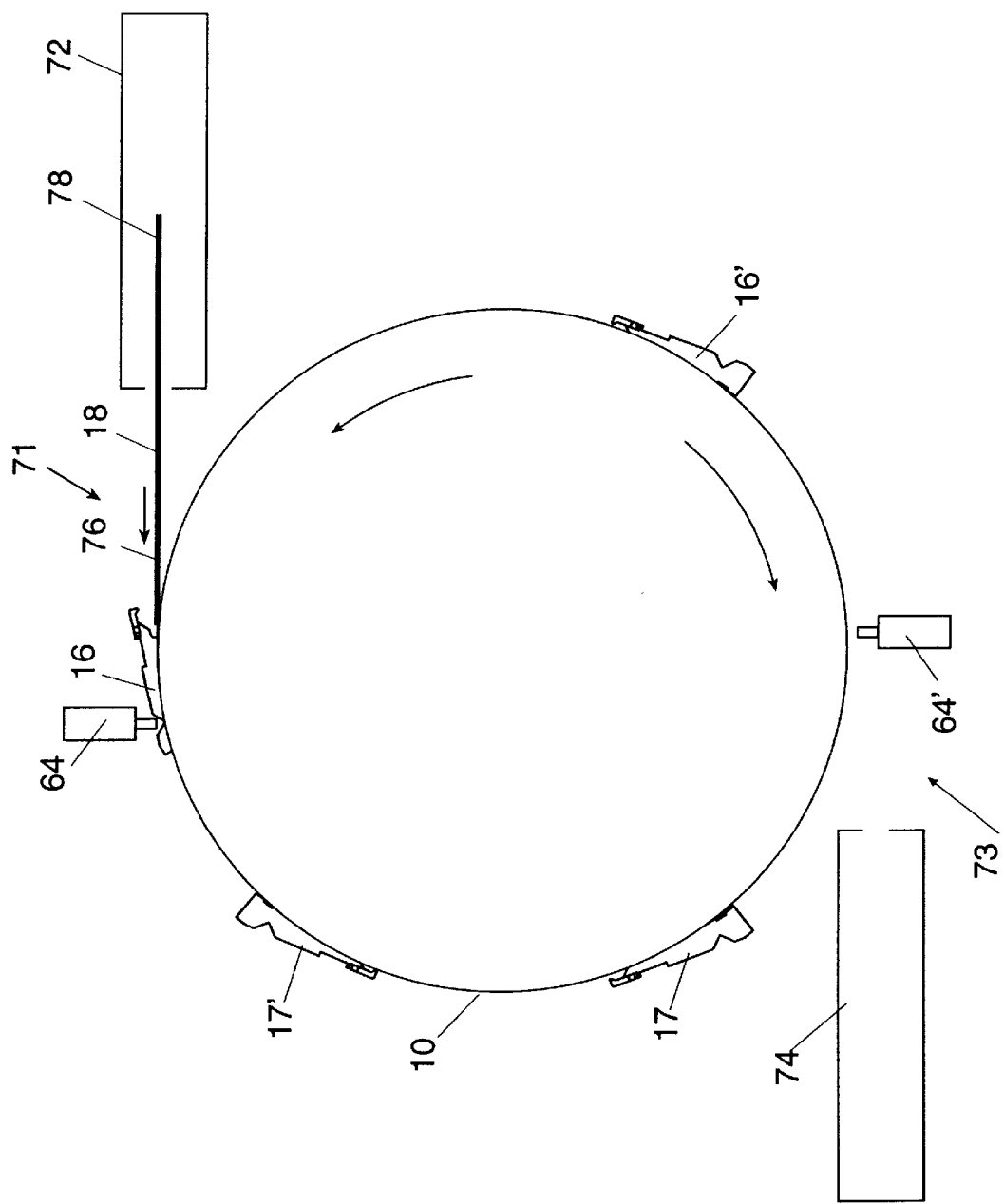
FIG. 11-A

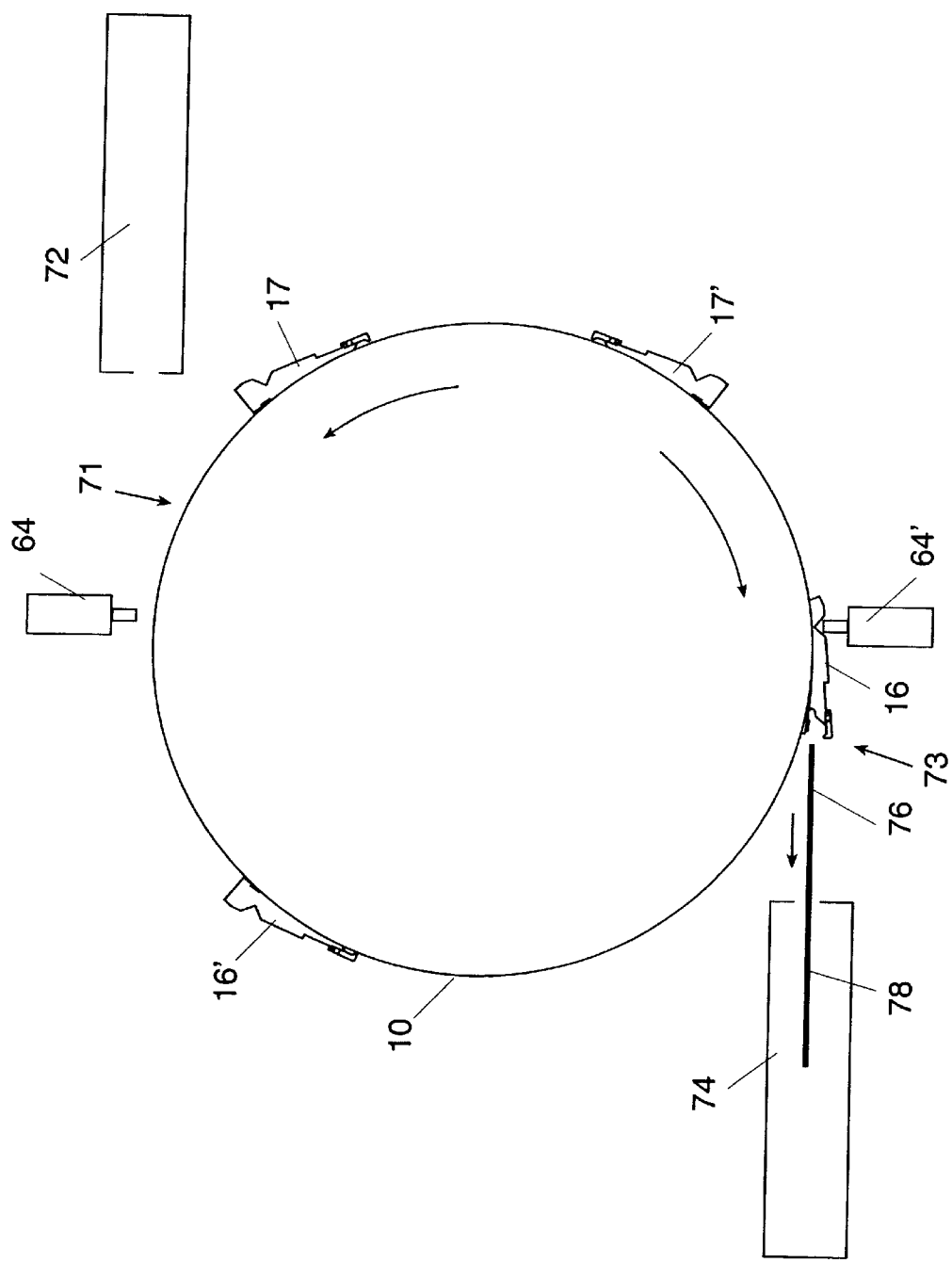
FIG. 11-B

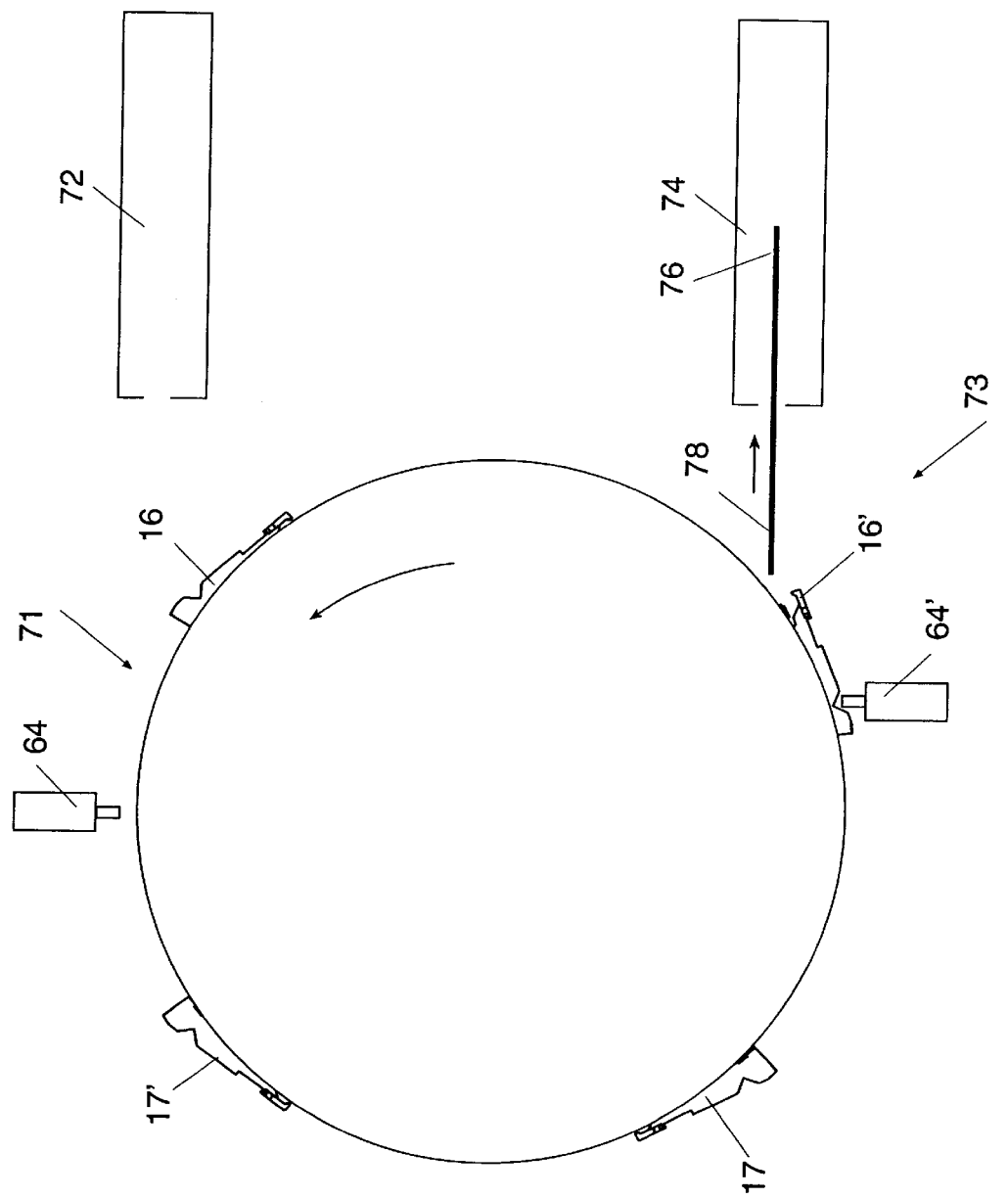
FIG. 12-A

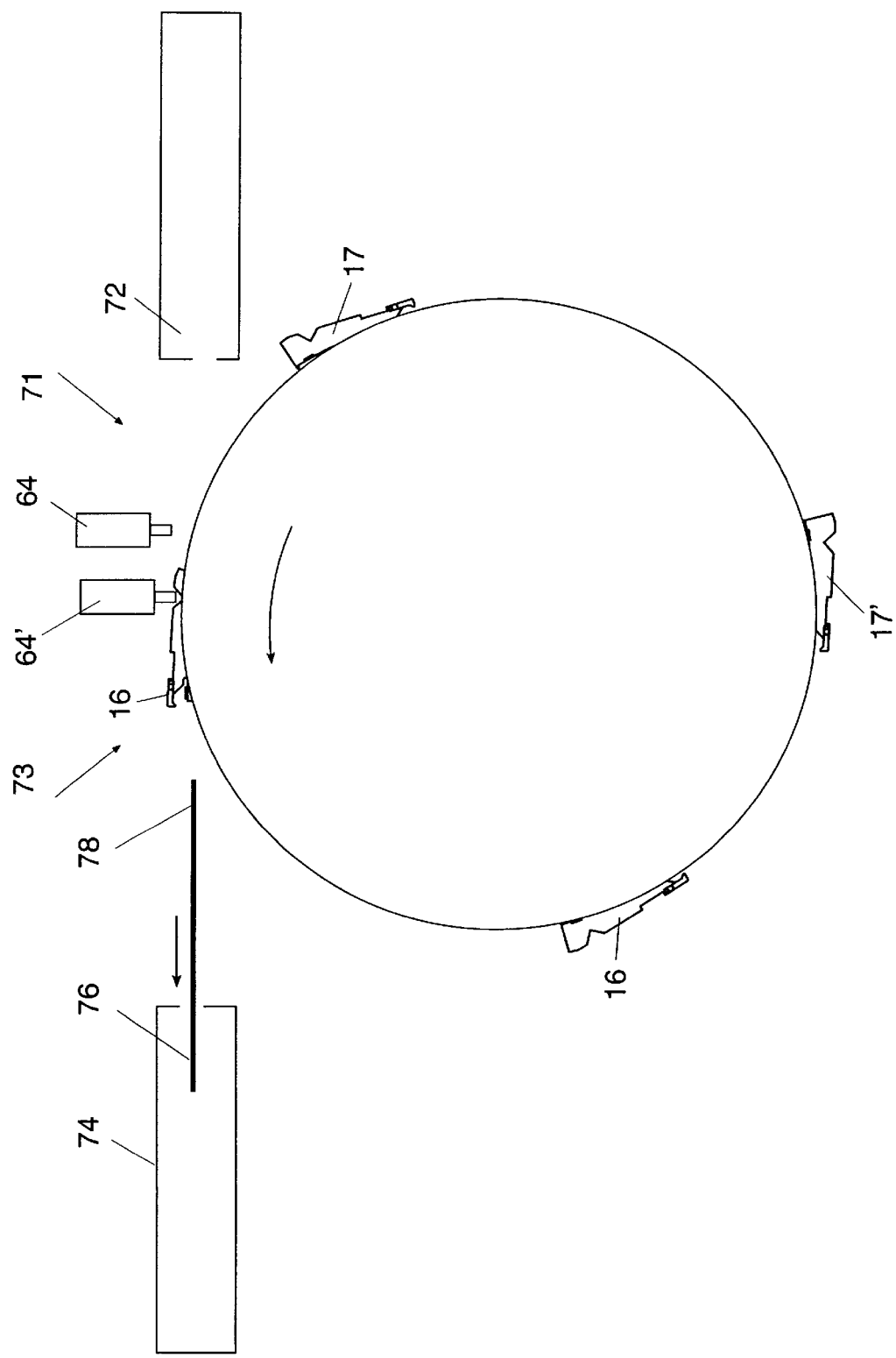
FIG. 12-B

APPARATUS FOR LOADING AND UNLOADING PLATES TO EXTERNAL DRUM DEVICES HAVING MOVABLE CLAMPS

This file is a CIP of Ser. No. 09/069,546 filed on Apr. 30, 1998 now U.S. Pat. No. 6,003,442.

FIELD AND BACKGROUND OF THE INVENTION

The present invention relates to attaching a plate to a rotatable drum and, more particularly, to conveniently attaching plates of various sizes to the drum of a so-called external-drum imagesetter or platesetter, by means of movable dynamic clamps, such that enable it to operate even at very high rotation speeds.

Imagesetters, namely marking engines for plotting images on plates or sheets of film, of the so-called external-drum type, are known in the art. Typically, a sheet is attached to the outer surface of a rotating drum and held in contact with the surface by a vacuum system, which has orifices distributed over the surface. Often, such an imagesetter is required to handle sheets of various sizes. U.S. Pat. No. 5,383,001 to Bosy addresses such a need, by providing a suitable design of the vacuum system.

External-drum platesetters are a particular category of external-drum imagesetters, wherein the image is plotted on a printing plate. Printing plates are generally made of metal and therefore they are stiffer than films and their mass per unit area is much higher. Thus, when a plate is attached to the drum, it requires a greater force to keep it in contact with the drum's surface at any given rotational speed, to counteract the centrifugal force, than is required by a film. Consequently, a vacuum system to hold plates on the rotating drum must be more efficient and more powerful than that used for holding films. However, even with a powerful vacuum system, there is a danger of failure, due to a bend or a bulge at the edge of the plate or due to a failure in the vacuum system itself. Moreover, above a certain rotational speed the centrifugal force per unit area may exceed the difference between atmospheric pressure and the actual vacuum pressure (which, in turn, has a practical lower limit), thus rendering such a plate attachment system, solely based on vacuum, ineffectual. In such a system failures may cause the entire plate to fly off the drum by centrifugal action—which would be disastrous for the entire machine. Therefore platesetters require mechanical attachment means—either to assist the vacuum system and guard against drastic failure, or as the main holding means, possibly still aided by vacuum. One common and useful such means is clamps mounted on the drum and operative to hold down the edges of the plate.

Clamps and grippers for holding a plate onto a rotatable drum have been known in the art. For example, clamps (also called grippers) are generally used in offset printing presses to hold the printing plate onto a cylinder. During operation, centrifugal forces act to cause a pulling force on each edge of the plate, such that tends to pull the edge from the clamp. Therefore in printing presses, clamps are designed to exert enough gripping force to exceed that required for countering the centrifugally induced pulling force, at maximum expected rotational speed, by a safety margin. Additionally, the gripping force of the clamps must exert a positive stretching force on the plate, in order to assure contact between the plate and the cylinder over its entire surface, as well as to counter the drag forces exerted on the plate by external rollers and cylinders that are in contact with it during the printing operation. Such clamps are disadvantageously cumbersome for mounting on platesetters and, moreover, difficult to activate (i.e. to open for accommodating the plate), because they must include either a heavy bolting or leveraging mechanism or a very strong spring-loading mechanism.

U.S. Pat. No. 3,203,074 describes an improved clamp, in which the gripping and stretching forces increase by centrifugal action in proportion to the rotational speed. A clamp with such a centrifugal action (also termed dynamic clamp) may overcome the disadvantages discussed in the previous paragraph. U.S. Pat. No. 4,250,810 discloses a further improved clamp with centrifugal action, whereby the gripping and stretching forces can be independently adjusted.

It is noted that in platesetters, there usually is also a vacuum system, which assures contact between the plate and the drum over its entire surface, and that therefore no stretching force, but only a gripping force, is required at the edges of an attached plate. U.S. Pat. No. 5,335,046 discloses a clamp for the drum of a platesetter with a mechanism that centrifugally induces a gripping force. There is a row of such clamps for the leading edge and another one for the trailing edge. The mechanism includes a weight, connected to the clamp by a rod, located inside the drum near the opposite surface. The clamp may be opened by means of a piston and cylinder assembly, activated by supplied pressurized air. The clamp mechanism of the '046 patent has two serious drawbacks: (1) It is relatively complicated, with a relatively large number of parts, and thus is expensive to manufacture. (2) It does not conveniently accommodate plates of various sizes. The secondly listed drawback also applies to other types of clamps of prior art, such as those discussed hereabove. The '046 patent does disclose the possibility of providing a row of trailing edge clamps for each plate size; however, such an arrangement is even more expensive and, furthermore, does not accommodate small variations in plate size; moreover, it does not provide for mounting a plurality of plates peripherally around the drum, in the case of small plates, thus detracting from productivity.

Associated with the manner of clamping plates to the drum is the manner of loading them onto the drum and of unloading them following the plotting operation—whether manually or by automatic mechanisms. Most systems of prior art are limited in the loading- and unloading configurations practically possible, generally enabling loading only upon, say, clockwise rotation of the drum and, correspondingly, unloading—only upon counterclockwise rotation of the drum. This places constraints on the design of loading- and unloading mechanisms and on their placement within the machine. More freedom in such design and placement may, in many cases, be advantageous.

There is thus a widely recognized need for, and it would be highly advantageous to have, a clamping system, for attaching a plate to a rotatable drum, that is adaptable to any plate size, possibly allowing the attaching of multiple plates, of various sizes, and that enables loading and unloading plates upon rotation of the drum in either direction.

SUMMARY OF THE INVENTION

The present invention successfully addresses the shortcomings of the presently known configurations by providing an inexpensive dynamic clamping system, for attaching plates of various sizes to a rotatable drum, such as that of a platesetter, so that they are firmly gripped at any rotational speed.

The present invention discloses a novel design of a clamp, which allows placing it at any position around the drum, to accommodate any length of plate, and to be anchored at that position with a force that increases by centrifugal action. The design of the clamp is, moreover, such that the gripping force exerted by it on the edge of the plate likewise increases wit the rotation speed of the drum by centrifugal action. The present invention further discloses a novel way of using such clamps to load and unload plates, to and from the drum, in the same general direction, thus enabling more practical configurations for feeding and disposing plates.

More specifically and according to a preferred embodiment, the clamp of the present invention comprises a gripper that is attached to the drum by means of a hinge. The largest part of the gripper consists of a body that extends substantially to one side of the pivot axis of the hinge. The portion of the gripper that extends to the other side of the pivot axis is relatively short and at its end is a tip, operative to press an edge of the plate onto the underlying surface of the drum. A spring is operative to provide a static force for the tip's pressure on the plate. During drum rotation, centrifugal force virtually acting on the large body of the gripper, in a radially outward direction, is translated by the pivoting effect into a radially inward force on the tip, thus increasing its pressure on the plate.

In a slidable configuration, the clamp also comprises a base, attached to the other member of the hinge (the first member being attached to, or part of, the gripper). The drum is provided with a plurality of undercut grooves, preferably in a circumferential orientation, each groove being wider at its bottom, inside the wall of the drum, than near the drum's surface. The base of the clamp is shaped to fit the wide portion of the groove and to slide therealong. The gripping force of the clamp also acts to push the base against the upper surface of the groove's wide portion, causing friction therebetween, thus keeping the clamp from sliding along the groove. The force of this friction also increases with the drum's rotation speed, owing to the increased gripping force and owing to centrifugal action on the base itself.

Slidable dynamic clamps are preferably mounted in pairs around each groove, there being a plurality of grooves across the length of the drum; the clamps of each pair face each other so as to clamp opposite edges of a plate. Thus each pair of clamps along a groove can clamp down a plate, its length being variable over a wide range. Likewise, a plurality of plates, of various and variable widths, may be mounted across the length of the drum, each plate clamped down by two or more pairs of clamps on adjacent grooves.

To mount a plate on the drum, a first clamp of each relevant pair is first opened, by pushing on its body radially inward by means of a stationary activation mechanism, then engaging it to the leading edge of the plate, which is fed from a suitably positioned loading mechanism, and releasing the clamps to grip it. The drum is then rotated, say clockwise, to pull the plate and wrap it around the drum. Then the other clamp of each pair is opened and the drum is rotated backward (say counter-clockwise), while the clamp remains stationary, until the trailing edge of the plate is engaged by the clamp, whereupon it is released, thus gripping that edge by slidable clamps. After normal imaging operation, the plate is demounted, in the same general order, by first releasing the first clamp of each pair (which grips the leading edge of the plate) and moving it away from the plate (by say counterClockwise rotation of the drum), thus freeing that edge, then rotating the drum forward (Clockwise), thus pushing the plate onto a suitably position unloading bin, and finally releasing the second clamp of the pair, thus freeing the plate.

According to the present invention, there is provided apparatus for clamping flexible plates of various sizes onto the cylindrical surface of a rotatable drum, comprising:
  a plurality of grooves, cut into the surface of the drum; and
  at least one clamp, each attached to the drum at one or more corresponding grooves and being switchable between two states—a clamping state and a released state;
  the clamp being fixed at any of a plurality of positions along the respective grooves and operative to clamp an edge of the plate, which crosses the groove, to the surface of the drum, when in a clamping state, and being slidable along the respective groove, when in a released state.

According to further features of the preferred embodiments of the invention, each of the clamps is a dynamic clamp, whereby the force at which it clamps the plate, when in the clamping state, consists of a constant component and a dynamic component, which is derived from centrifugal action and is essentially proportional to the rotational speed of the drum. Furthermore, each of the clamps includes:
  a base that is slidable within, and along, the respective groove and forming one member of a hinge, having a pivot axis, and
  a gripper, formed to have a tip and operative to press the edge of the plate against the drum,
  the gripper being attached to the base so as to form the other member of the hinge and so that the center of mass of the gripper is at a substantial distance from the pivot axis and in a first direction therefrom that is generally opposite the direction of the tip from the pivot axis.

Additional features of the present invention include an activation mechanism, not attached to the drum and including at least one member that is movable essentially radially to the cylindrical surface and operative
  to engage the gripper of any clamp, while in an appropriate position, at a point thereof that lies in the first direction from the pivot axis,
  to switch the clamp to the release state, by moving radially inwards, and
  to switch the clamp to the clamping state, by moving radially outwards.

In a preferred embodiment, the grooves lie along circumferential lines and the activation mechanism and any of the clamps, while in the release state and while being engaged by a respective one of the members, cooperate to cause the base of the clamp to slide along the respective groove in reaction to a rotation of the drum.

According to yet other features of the invention, the number of the grooves is at least four, the apparatus being operative to clamp at least two plates, side by side, onto the surface of the drum, the plates not necessarily being equal in length or in width, and the number of the clamps in any groove is even, the clamps forming circumferentially adjacent pairs, the clamps of each pair being disposed and operative to clamp respective opposite edges of a corresponding plate.

In an alternative configuration of the invention, some or all of the grooves lie along lines parallel to the axis of the drum.

In another aspect of the present invention, there is provided apparatus for loading a flexible plate onto the cylindrical surface of a rotatable drum, attaching the plate thereto and unloading the plate therefrom, the plate having a leading edge and a trailing edge, the apparatus comprising:

a plate loading assembly and a plate unloading assembly, both positioned in the vicinity of the drum; and at least one pair of sets of clamps, attached to the drum, all clamps in a first set of each pair being operative to clamp the plate at its leading edge onto the surface of the drum and the second set of each pair being operative to clamp the plate at its trailing edge onto the surface of the drum;

and being operative to load the plate from the loading assembly, leading edge first, while the drum rotates in a first direction, and to unload the plate onto the unloading assembly, leading edge first, while the drum rotates in the first direction.

According to further features of the second aspect of the invention, only the first set of clamps clamp the plate during loading and only the second set of clamps clamp the plate during unloading, and each clamp is switchable between two states—a clamping state and a released state—and circumferentially movable, with respect to the surface of the drum, while in the released state.

According to still further features of the invention, the plate loading assembly and the plate unloading assembly are positioned substantially at one and the same side of the drum or at the same level. In certain configurations of the invention, there are at least two pairs of sets of clamps and the apparatus is further operative to similarly load at least one other plate from the loading assembly and to attach them to the drum in circumferentially tandem positions, and a plate may have any of a plurality of widths and any of a plurality of lengths.

Also disclosed is a method for loading at least one flexible plate onto the cylindrical surface of a rotatable drum, simultaneously clamping each plate thereto and unloading each plate therefrom, each plate having a leading edge and a trailing edge, the method comprising:

(a) providing a plate loading assembly and a plate unloading assembly and positioning them in the vicinity of the drum;

(b) providing, for each plate to be simultaneously clampable to the drum, a pair of sets of clamps and attaching them to the surface of the drum so that each clamp is movable along a circumferential line, whereby each clamp is switchable between a clamping state and a released state and being operative, while in the clamping state, to clamp an edge of a plate engaged thereto onto the surface of the drum;

(c) feeding a plate from the loading assembly until its leading edge engages a first set of a corresponding pair of the sets of clamps, while all clamps thereof are in the released state;

(d) switching the clamps of the first set, while engaged by the plate, to the clamping state, then slowly rotating the drum in a first direction so as to pull the plate from the loading assembly and to wrap it around the drum;

(e) moving the clamps of the second set of the pair, while in the released state, until they engage the trailing edge of the plate wrapped in step (d), then switching them to the clamping state;

(f) repeating steps (c), (d) and (e) for each additional plate to be loaded, if any;

(g) for unloading each clamped plate, switching the clamps of corresponding the first set to the released state and moving them away from the leading edge, then slowly rotating the drum in the first direction so as to push the leading edge of the plate onto the unloading assembly;

(h) switching the clamps of corresponding the second set to the released state, to allow the unloading assembly to pull the plate, released in step (g), from the drum.

BRIEF DESCRIPTION OF THE DRAWINGS

The invention is herein described, by way of example only, with reference to the accompanying drawings, wherein:

FIG. 4B is a top view and sectional side view of the slidable clamp of FIG. 4A;

FIGS. 11A and 11B are schematic end views of the clamping system of FIG. 9, illustrating loading- and unloading plates according to a first configuration.

FIGS. 12A and 12B are similar to FIGS. 11A and 11B, but illustrate a preferred configuration of plate loading- and unloading.

DESCRIPTION OF THE PREFERRED EMBODIMENTS

The present invention is of a dynamic clamping system, for attaching one or more plates to a rotatable drum and for enabling loading and unloading of the plates to- and from the drum upon its rotation in either direction.

Specifically, the present invention can be used to easily attach a plate, or a plurality of plates, of any size to the drum of a marking engine, such as a platesetter, so that the plate is firmly gripped at any rotational speed. The clamping system is characterized by being operable for loading and unloading plates with the drum rotating in either sense. While the preferred embodiment is concerned with attaching a printing plate to the drum of a platesetter (i.e. a device for plotting images from digital sources onto printing plates), it will be understood that the present invention is applicable to attaching also any other types of plates and sheets of any media, such as film, paper or plastic foils, to any rotatable drum for any other purpose. The preferred embodiment also includes clamps, or grippers, of a particularly advantageous design, as described and claimed in a copending patent application. It should, however be understood that also other types of clamps and grippers may be used, such as those relying entirely on springs, or on magnets, to provide the gripping pressure or centrifugally actuated grippers of other designs—all coming within the scope of the present invention.

The principles and operation of a clamping system according to the present invention may be better understood with reference to the drawings and the accompanying description.

Figure 1:
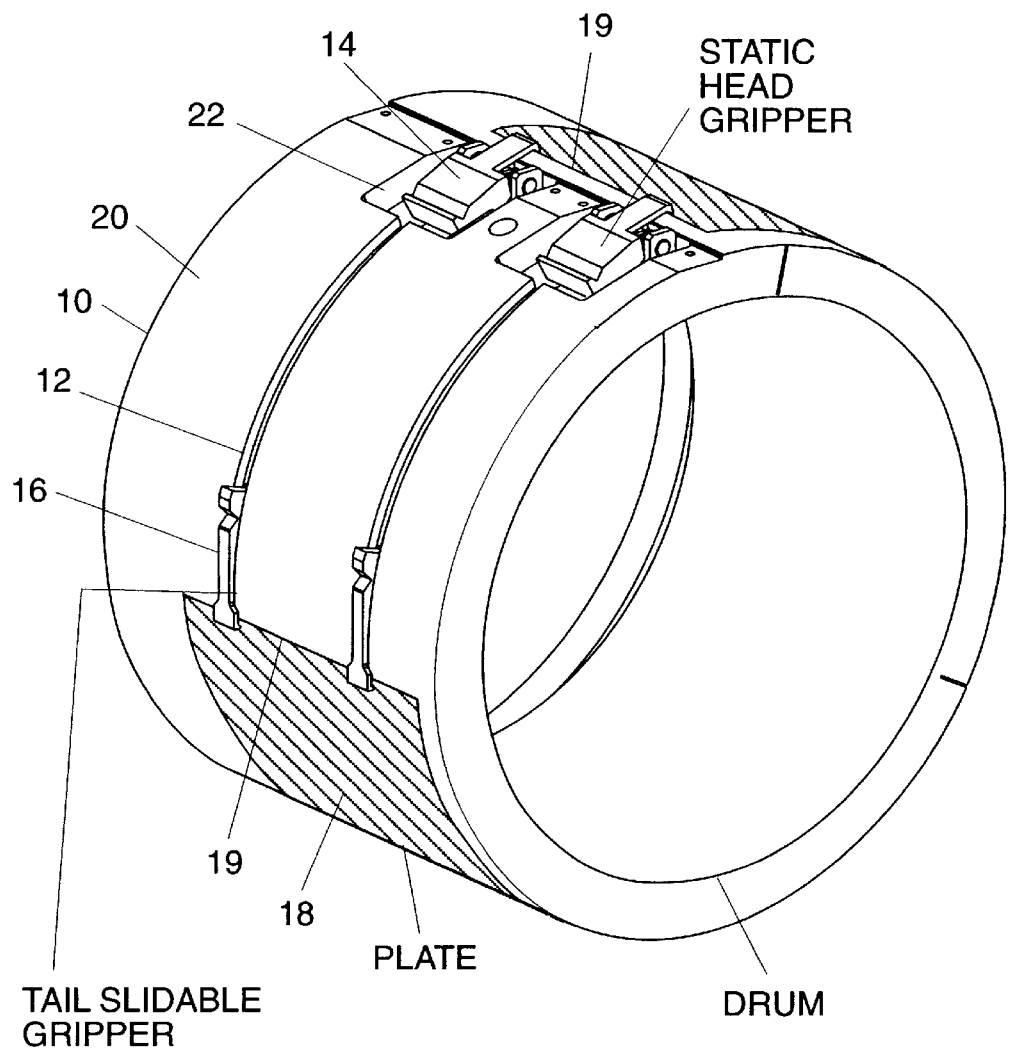
FIG. 1 is an isometric drawing, schematically showing a drum with the clamping system of the present invention.
Figure 2:
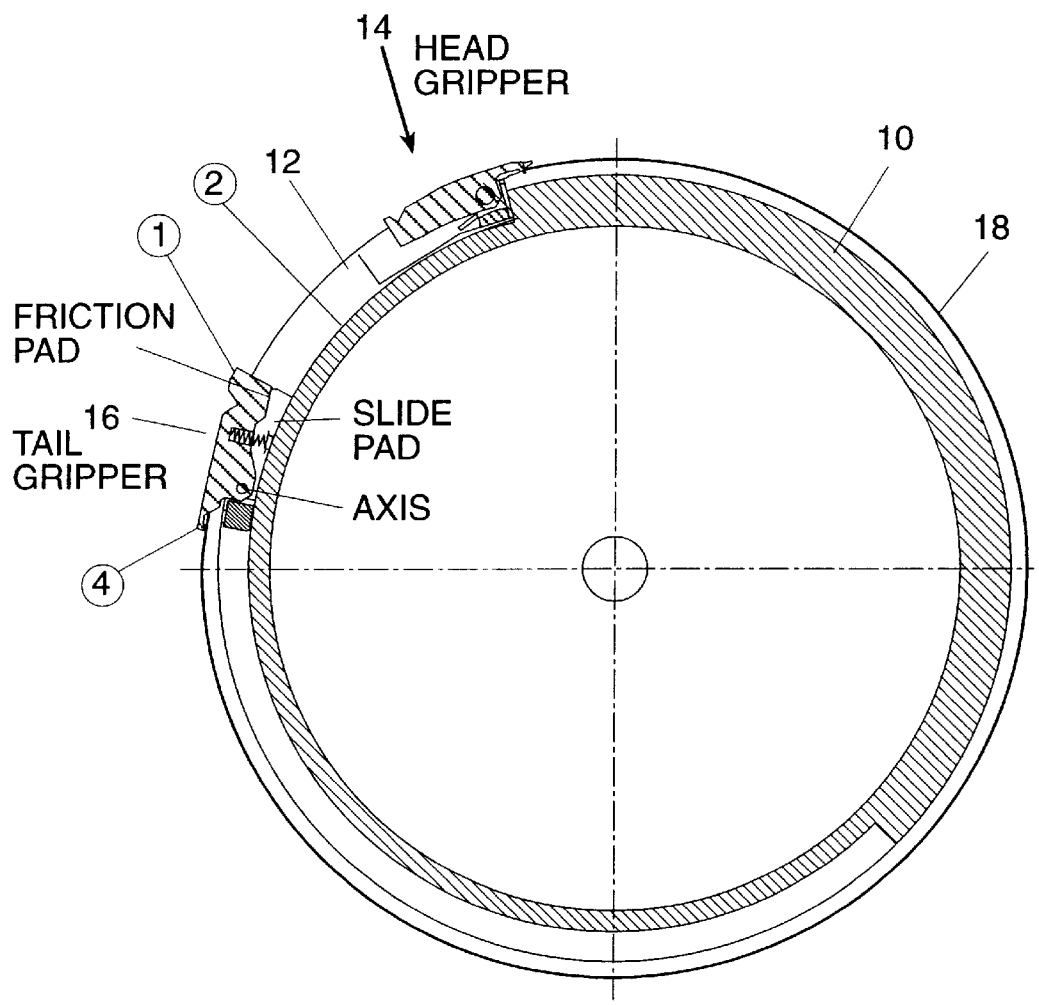
FIG. 2 is a cross-sectional view of the system of FIG. 1.

Referring now to the drawings, FIG. 1 is an isometric view, and FIG. 2—a cross-sectional view, of a drum with a preferred embodiment of the clamping system of the present invention. There is shown a drum 10, with outer surface 20. Surface 20 is cut by two (generally—several) grooves 12 running circumferentially and extending over a considerable portion of the drum's circumference. Each groove 12 has an undercut profile, to be described herebelow. At one end of each groove 12 is a stationary clamp 14, fixedly attached to drum 10. Stationary clamp 14 is attached preferably within a depression 22, cut into surface 20, in order to keep the extent of the clamp above surface 20 to a minimum, so as to clear a writing assembly (not shown) suspended a distance above the surface. In each groove 12 there is a slidable clamp 16, to be described herebelow. Stationary clamp 14 and slidable clamp 16 are operative to grip a plate 18 near its end edges 19. Drum 10 is preferably provided with a vacuum system, operative to press the entire surface of plate 18 onto surface 20.

Figure 5:
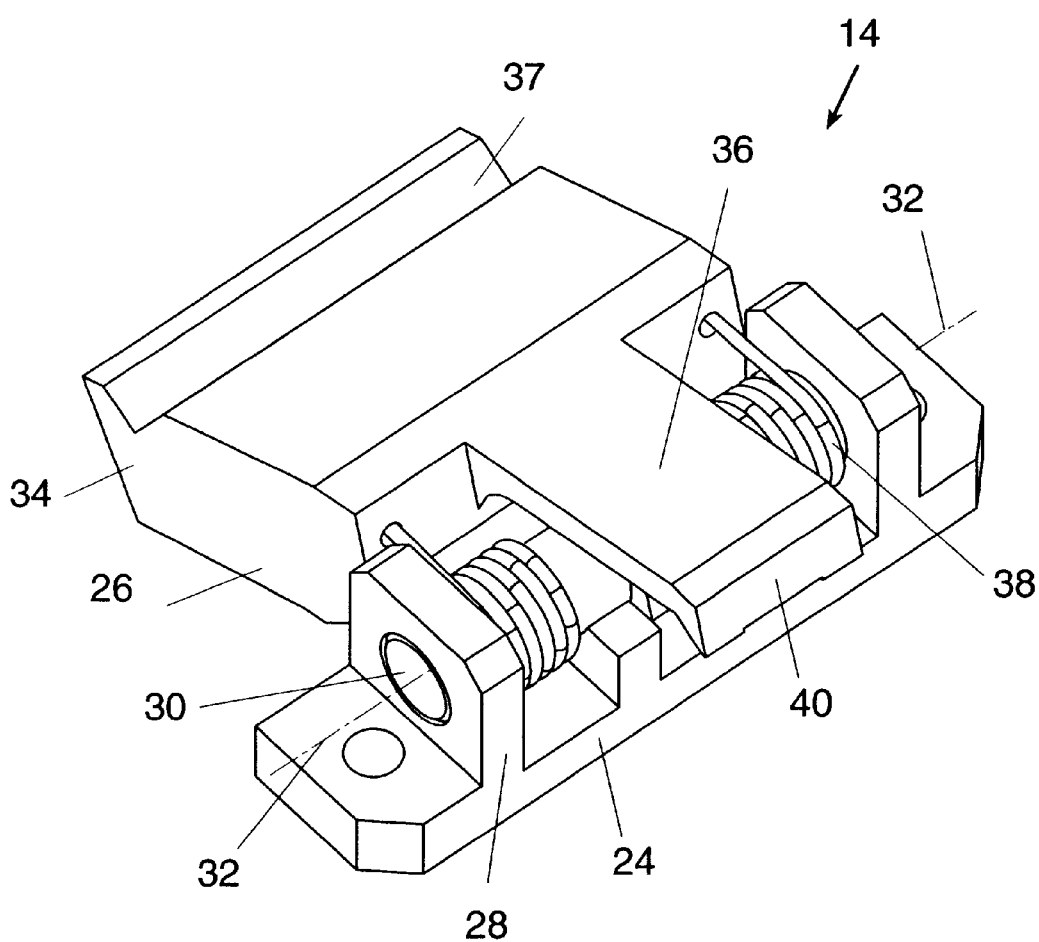
FIG. 5 is an isometric view of a stationary clamp according to the present invention.

Referring now to FIG. 5, there is shown the construction of stationary clamp 14. It consists essentially of two parts—a base 24 and a gripper 26—mutually attached by a hinge 28, which, for example includes a cylindrical pin 30, whose axis forms the pivot axis 32 of the hinge. Gripper 26 is formed so as to have a relatively large body 34, extending to one side of pivot axis 32, and a relatively short tongue 36, extending to the other side of pivot axis 32. Body 34, preferably has a flat top surface, with a notch 37 cut across it. Tongue 36 has a tip 40. It is noted that base 24 serves to join hinge 28 to the drum and could also be regarded as part of the hinge structure; other structures and other means for such joining may be provided. The assembly of stationary clamp 14 also includes a spring, such as coiled spring 38, disposed around hinge pin 30.

Stationary clamp 14 is attached to drum 10 by fastening base 24 to the drum, for example—by means of screws, preferably inside a depression 22 (FIG. 1), so that tongue 36 points in a circumferential and so that tip 40 lies beyond the depression (that is, in contact with surface 20). Spring 38 acts to lift body 34 away from the drum and thus press tongue 36 toward the drum. The tip 40 of tongue 36 preferably has a friction pad or one or more small protrusions thereon, facing the drum. Normally, tip 40 is pressed against drum surface 20. Spring 38 acts to make this pressure strong enough to grip the edge of a plate, which has been inserted between the tip and the drum surface, under static conditions. All stationary clamps 14 are attached to drum 10 so that they are aligned along a line that, preferably, is parallel to the drum's axis and are all pointing in the same direction.

When drum 10 rotates, centrifugal force on body 34 tends to lift it away from the drum. This force is translated by the pivoting action into a radially inward force of tip 40, which thus increases its pressure against drum surface 20 and consequently also the gripping force on the edge of a plate therebetween. The centrifugal force is essentially $$CF = M \times \omega^2 \times R$$

where M is the mass of gripper 26, $\omega$ is the angular speed of the drum and R is the distance from the drum's axis of rotation (not shown) to the center of mass 42 of gripper 26. The force at tip 40 is essentially $$TF = CF \times D1/D2$$

where D1 is the distance from pivot axis 32 to center of mass 42 and D2 is the distance from pivot axis 32 to the middle of tip 40. Clearly, it is desirable, at any rotational speed, to make TF large enough to grip the edge of the plate firmly enough to prevent its being pulled out. This can be achieved, for any given design of tongue 36 and tip 40 (which also fixes D2), by making the moment of centrifugal force, CF×D1, to be of sufficient magnitude. This, in turn, is obtained, for a given drum radius R and any angular speed $\omega$, by making the moment of mass of gripper 26 with respect to pivot axis 32, M×D1, to have sufficient magnitude. The moment of mass may be made sufficiently large by appropriate construction of body 34; for example, M may be made large enough by making the body's volume large and/or fabricating it out of a high-density substance, while a sufficient complementary value for D1 may be obtained by shaping the body so as to extend sufficiently far from hinge 28.

Figure 4A:
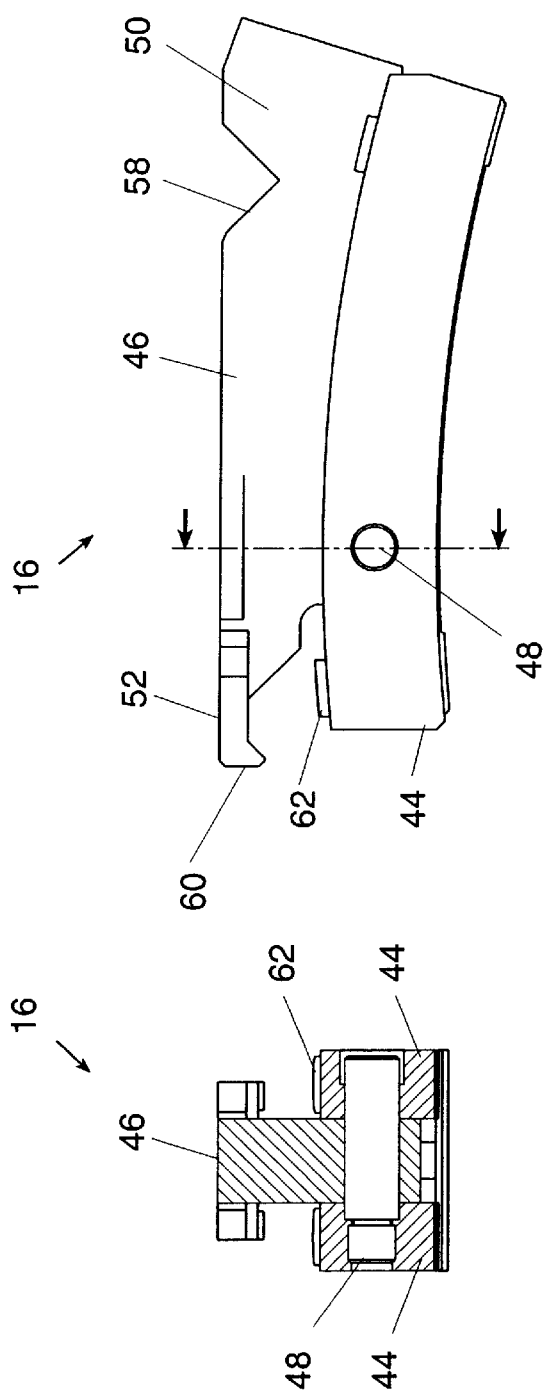
FIG. 4A is a side view and cross-sectional view of a slidable clamp according to the present invention.

We now refer to FIG. 4A, which shows slidable clamp 16 in a side view and in a cross-sectional view and FIG. 4B, which shows the same in a length-sectional view and a top view. Slidable clamp 16 is, in principle, similar to stationary clamp 14—both in its construction and in its mode of action, except for some essential details, to be described herebelow. It consists of base 44 and a gripper 46, joined by a hinge, which includes, for example, pivot pin 48. Gripper 46 is formed to have, on one side of pivot pin 48, an elongated massive body 50 and, on the other side of that pin, a short tongue 52, which ends with a tip 60. A spring 51, preferably of the compression type, is disposed between base 44 and body 50. When clamp 16 is mounted on drum 10 (as will be described herebelow), spring 51 acts to push body 50 radially outwards and, by the pivoting action, to press tip 60 radially inwards. When the edge of a plate lies under tip 60, the latter then presses against it. When the drum rotates, the centrifugal force virtually acting on body 50 is added to the push of spring 51 and thus the pressure of tip 60 on the plate underneath it is increased—all in a manner similar to that described hereabove with respect to stationary clamp 14. Clearly, again, it is desirable to make the mass of body 50 of gripper 46 as large as possible. This can be done by making it of dense material and/or by making any of its dimensions as large as possible. In the preferred embodiment described herein, body 50 is shaped to be narrow and relatively tall (i.e. with large dimension in the radial direction), but also other shapes are possible. According to this embodiment, base 44 has a central slot sunk into its upper surface over most of its length, the width of the slot being slightly greater than the width of body 50. Thus base 44 can partially accommodate body 50 during the latter's motion about pivot 48.

Figure 3:
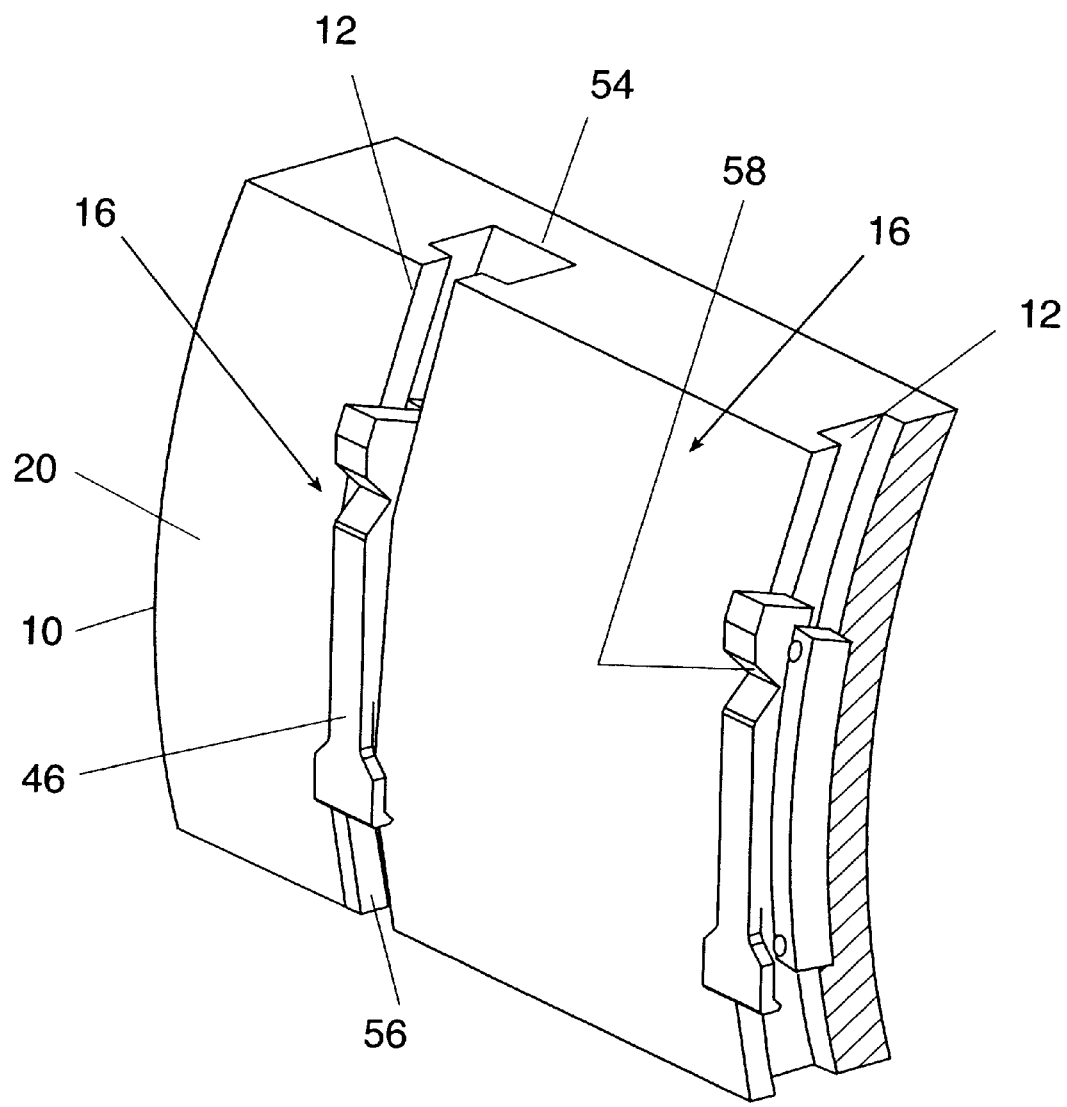
FIG. 3 is an isometric drawing, schematically showing a portion of the drum of FIG. 1 with slidable clamps according to the present invention.

Referring now to FIG. 3, which shows a section of drum 10 with corresponding segments of two grooves 12 (one of them shown cut open) and a slidable clamp 16 mounted inside each groove, it is noticed that each groove 12 is undercut into the wall of drum 10; that is, the groove is relatively narrow near surface 20 of the drum and wider under the surface, inside the wall. Preferably, the profile shape of the wide portion 54 of groove 12 is rectangular. Base 44 of slidable clamp 16 is formed to conform to wide portion 54 and to easily slide therealong. Body 50 of gripper 46 is formed to be slightly narrower than the narrow portion 56 of groove 12, so that it is slidable through that narrow portion whenever base 44 slides through wide portion 54. Preferably, body 50 of gripper 46 is also formed, and clamp 16 assembled, so that in its normal position, body 50 protrudes from groove 12 beyond surface 20. The top surface of body 50 preferably has a depression, such as notch 58, cut into it (to be engaged by an activation pin, as described herebelow).

Slidable clamps 16 are mounted each in a groove 12 so that tip 60 of tongue 52 of gripper 46 points circumferentially in a direction that is opposite the direction in which the fixed clamps point. As will be described herebelow, during normal operation, the (preferably) trailing edge of plate 18, mounted on drum 10, lies underneath tip 60 and is pressed by the latter. Tip 60 is preferably substantially wider than narrow portion 56, thus bridging the latter and pressing the plate directly against drum surface 20. It is also preferably provided, on its side facing plate 18, with one or more small protrusions or with a friction pad. These are operative, under the aforementioned pressure by the tip on the plate against surface 20, to firmly grip the edge of the plate.

The bottom surface of base 44 is preferably coated with a glide pad, which operates to ease its sliding on the bottom surface of wide portion 54 of groove 12 whenever pushed against it. The top surface of base 44 has preferably attached thereto one or more friction pads 62 (FIGS. 4), positioned so as to be able to contact the top surface of wide portion 54 of groove 12. The gripping force of tip 60 on the plate (due to the action of spring 51 and, during drum rotation, due to centrifugal force on body 50) is countered by an upward pressure of the portion of base 44 that lies underneath (opposite) tongue 52. The base is thus pressed against the top surface of wide portion 54, preferably through pads 62, thereby inhibiting any sliding motion therebetween. During drum rotation, additional upward pressure is exerted by the entire base 44, due to centrifugal forces on itself—which adds to its friction with the top surface of wide portion 54.

Looking at the action of slidable clamps 16 from a different point of view, the clamps may be regarded as forcefully clamping together the plate (at its edge) and the outer shell of the drum (being between the top surface of wide portion 54 and drum surface 20)—simultaneously anchoring the plate and base 44 to the drum. The clamping force is increased by centrifugal action on body 50. In the case of stationary clamps 14, the clamping action is on the plate alone—between tip 40 and drum surface 20.

It is noted that the construction of the clamps of the present invention, of both types, is inherently simple and involves a very minimal number of components. Such clamps are therefore advantageously inexpensive to fabricate.

Figure 6:
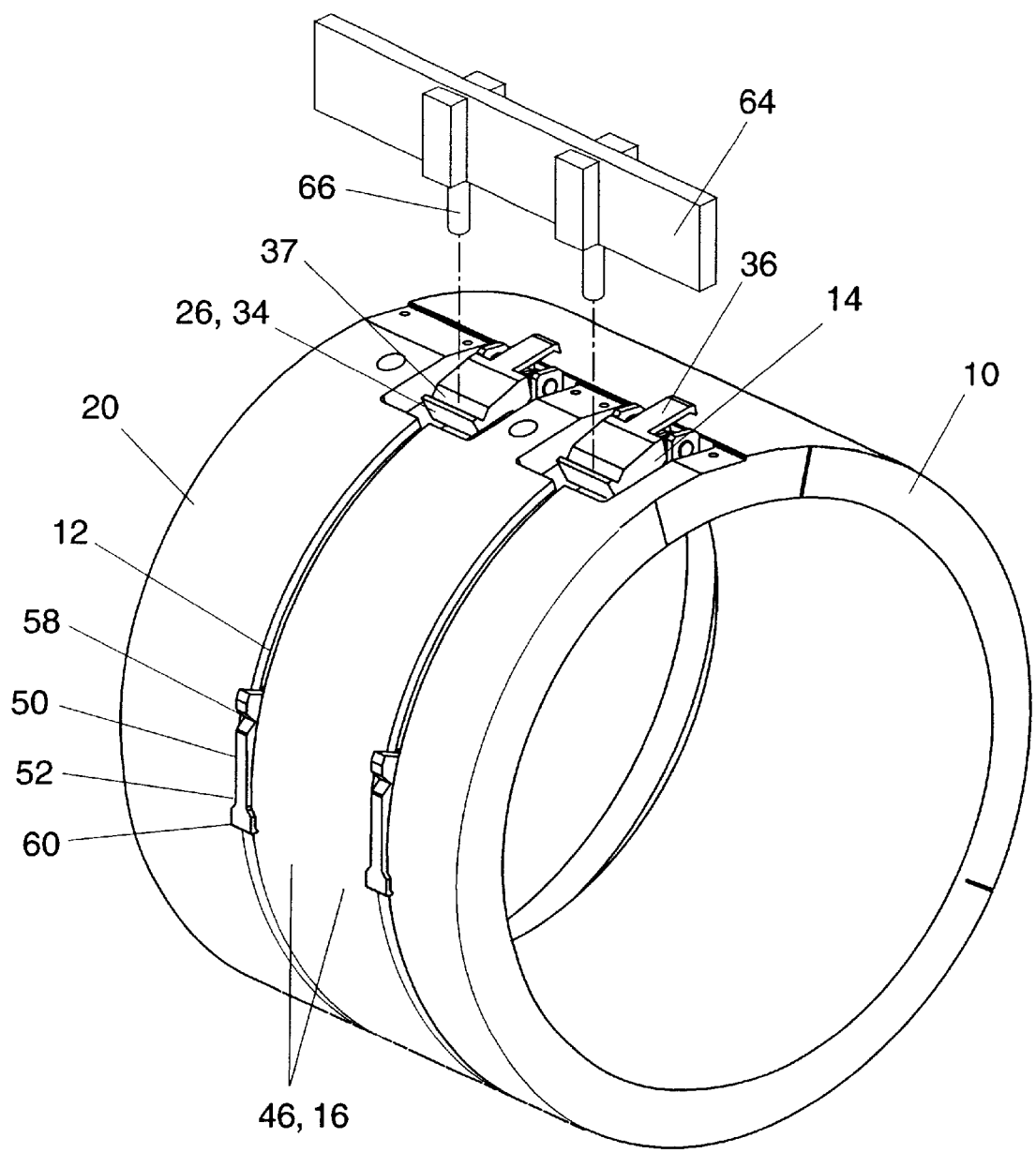
FIG. 6 is a schematic isometric drawing of a platesetter illustrating operation of the clamping system of the present invention.

Typical operation of the clamps will now be explained with reference to FIG. 6. There is shown, by way of example, an activation mechanism, positioned at a plate loading station, in relation to the drum and the clamps thereon. It includes a bar 64, subtending the length of drum 10 and suspended, parallel to its axis, at a certain distance from surface 20. In bar 64 are pins 66, one pin essentially coplanar with each groove 12, which are movable radially. The pins may be moved by any of a variety of means, such as solenoids, pneumatic actuators or a cam. In an alternative configuration, bar and pins may be replaced by a direct activation mechanism, such as a cam or a manually operable lever assembly. Mounting of a plate, to be subsequently plotted, onto drum 10 typically proceeds as follows:

1. Initially all slidable clamps are preferably aligned along a common line, parallel to the drum's axis and circumferentially just far enough from the stationary clamps to freely accommodate the full length of the plate; the latter condition can be arrived at by moving all slidable clamps in a manner similar to that described in steps 7 and 8 herebelow, whereas initial alignment along a line can easily be performed manually.
2. The drum is rotated to a position (shown in the illustration) such that notch 37 on body 34 of each stationary clamp 14 is directly under a corresponding one of pins 66.
3. Pins 66 are pushed inwards, pressing on bodies 34 against the force of spring 38 (FIG. 5) and causing tips 40 to lift off surface 20.
4. A new plate (not shown) is introduced tangentially to the drum (from top right, in the illustration) and registered thereon preferably by means of registration pins provided thereon) so that preferably its leading edge is positioned under tongues 36 of all relevant clamps 14, a certain distance behind corresponding tips 40.
5. Pins 66 are withdrawn, freeing all grippers 26 to grip the edge of the plate, in a manner explained hereabove.
6. The drum is slowly rotated forward (counter-clockwise in the illustration) while the plate is being gradually wrapped around its surface, for example by means of rollers (not shown); if a vacuum system is included, the vacuum may be applied at this step.
7. Rotation stops when notches 58 on bodies 50 of slidable clamps 16 are positioned directly below pins 66; the pins are then pushed inwards, pressing on bodies 50 against the forces of springs 51 (FIGS. 4) and causing tips 60 to lift off surface 20; they also cause bases 44 to be pushed against the bottom surfaces of grooves 12.
8. The drum is slowly rotated backwards (clockwise in the illustration) while clamps 16, which are held stationary by pins 66 engaging notches 58, slide along their respective grooves 12.
9. The backward rotation stops when the other (preferably trailing) edge of the plate becomes positioned under tongues 52 of the relevant clamps, a certain distance behind corresponding tips 60.
10. Pins 66 are withdrawn, freeing all grippers 46 to grip the trailing edge of the plate, in a manner explained hereabove.
11. The drum is accelerated to normal operational speed and plotting proceeds in the usual manner.

Demounting of the plate, after plotting, proceeds in a similar manner, though essentially in a reverse order. For this operation, another bar, similar to activation bar 64 with pins 66, but positioned at an unloading station, may be used.

It is noted that during normal (fast) drum rotation, the clamps firmly grip the plate, through the pressure of the tips of the tongues against the drum surface, and simultaneously each slidable clamp is, in effect, anchored in its position, through friction (preferably by means of the friction pads) between the top surface of its base and the top surface of the wide portion of the groove—all assisted by centrifugal effects, as explained hereabove.

It is also noted that the position of each slidable clamp along its respective groove is infinitely variable, within a range determined by the circumferential length of a groove, and that therefore the length of a plate that can be gripped by it may assume an infinite number of values within a corresponding range. It is likewise noted that operating the clamps (both in gripping a plate and in positioning a slidable clamp) is relatively easy, whether done manually or by an activation mechanism such as described hereabove. It is further noted that even if only a single length of plates need ever be accommodated, the configuration with slidable clamps advantageously eases the process of gripping plates during mounting and releasing them during demounting (all—by the use of reverse rotation).

It will be appreciated that other means and procedures, including manual ones, for mounting a plate on the drum, or demounting it therefrom, and for operating the clamps and moving the slidable clamps along the grooves, are possible—all coming within the scope of the present invention. It will also be appreciated that a drum may be provided with any number of stationary clamps and any number of grooves, each groove with one or more slidable clamps, but not all clamps need be engaged; in particular, if a plate substantially narrower than the length of the drum is mounted, only a corresponding number of the clamps would be engaged in gripping it. Although, in the preferred embodiment, each stationary clamp is paired, and axially aligned, with a groove and a corresponding slidable clamp, it will be appreciated that such pairing and/or alignment is not essential and that the number of stationary clamps need not be equal to the number of slidable clamps. In such a case, the activating mechanism of FIG. 6 may include additional pins—for any stationary clamps that are not aligned with corresponding grooves. It is noted that, with a plurality of clamps and grooves, it is possible to mount a plurality of plates, side by side along the drum; moreover, the plates thus mounted may variably be of any width (limited, of course, by the total width having to be less than the drum's length) and of any length (within the maximum length that can be accommodated between the clamps). Furthermore, in the case of multiple slidable clamps in any one groove, these may be paired with each other, clamps of any one pair facing each other and operable to hold a plate between them; in particular, if their number is odd, one slidable clamp is made to face the stationary clamps, while the others are mutually paired; such a configuration is similar to that described in the next paragraph.

Figure 8:
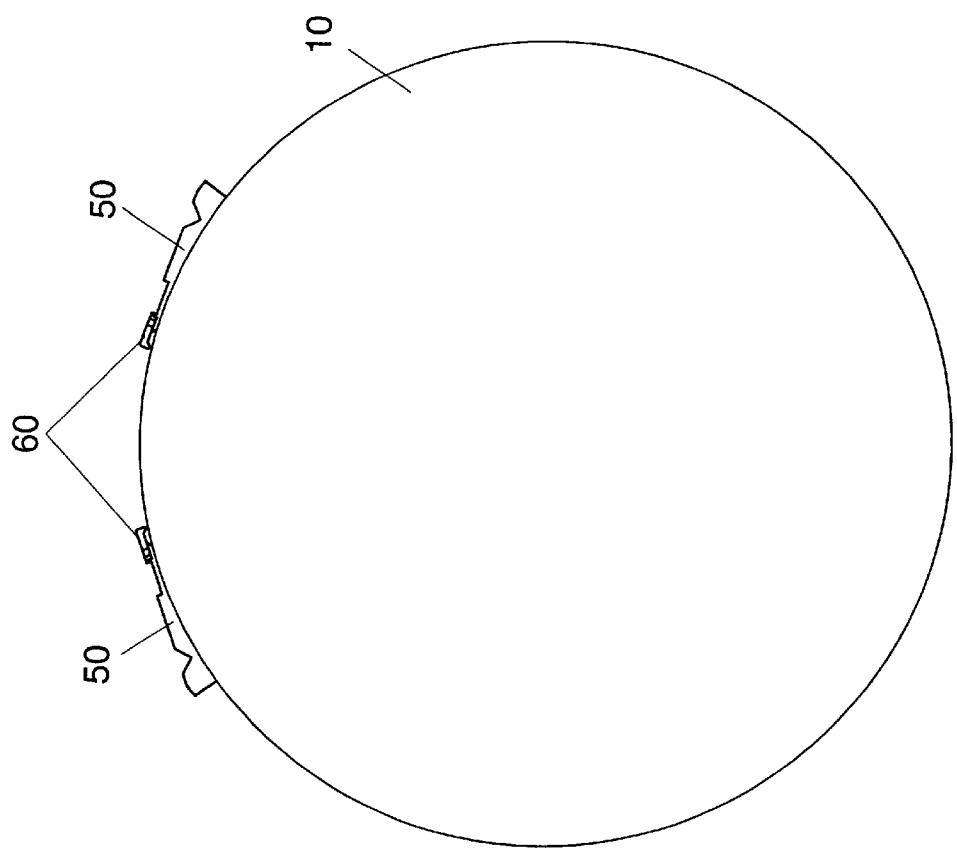
FIG. 8 is a schematic end view of the clamping system of FIG. 6, with all clamps being slidable.

Another configuration is shown schematically, in an end view of the drum, in FIG. 8. This configuration is similar to that of FIG. 6, except in that all clamps are of the slidable type. Here are disposed in each groove (not shown) around drum 10 a pair of slidable clamps 50, with the tips 60 of each pair circumferentially facing each other. The operation of this configuration is similar to that of FIG. 6; however, in this configuration there is freedom in choosing the set of clamps to be operated first during plate mounting and, independently, the set of clamps to be operated first during plate demounting. This freedom is advantageous in the context of the loading and unloading arrangement, as will be explained herebelow.

Figure 9:
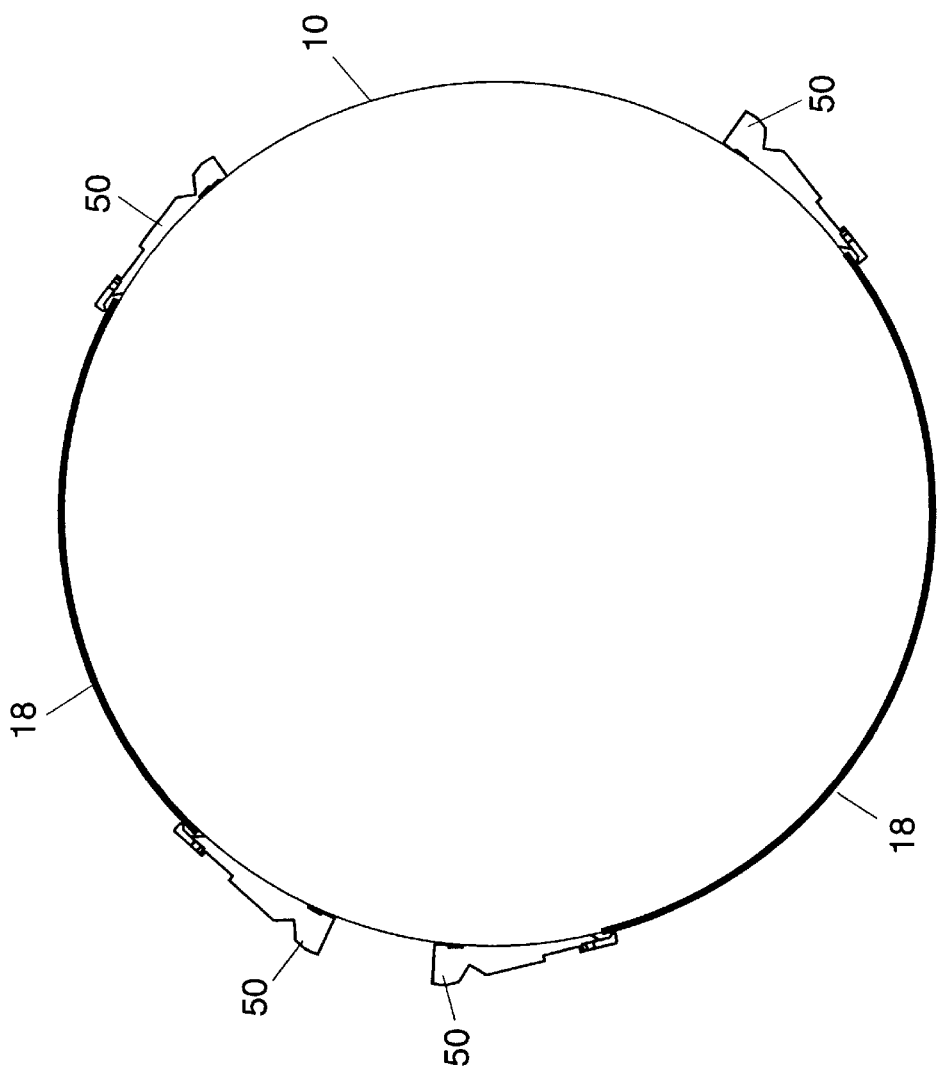
FIG. 9 is an end view of an alternative configuration of the system of FIG. 8, schematically showing two pairs of clamps and plates clamped by them.
Figure 10:
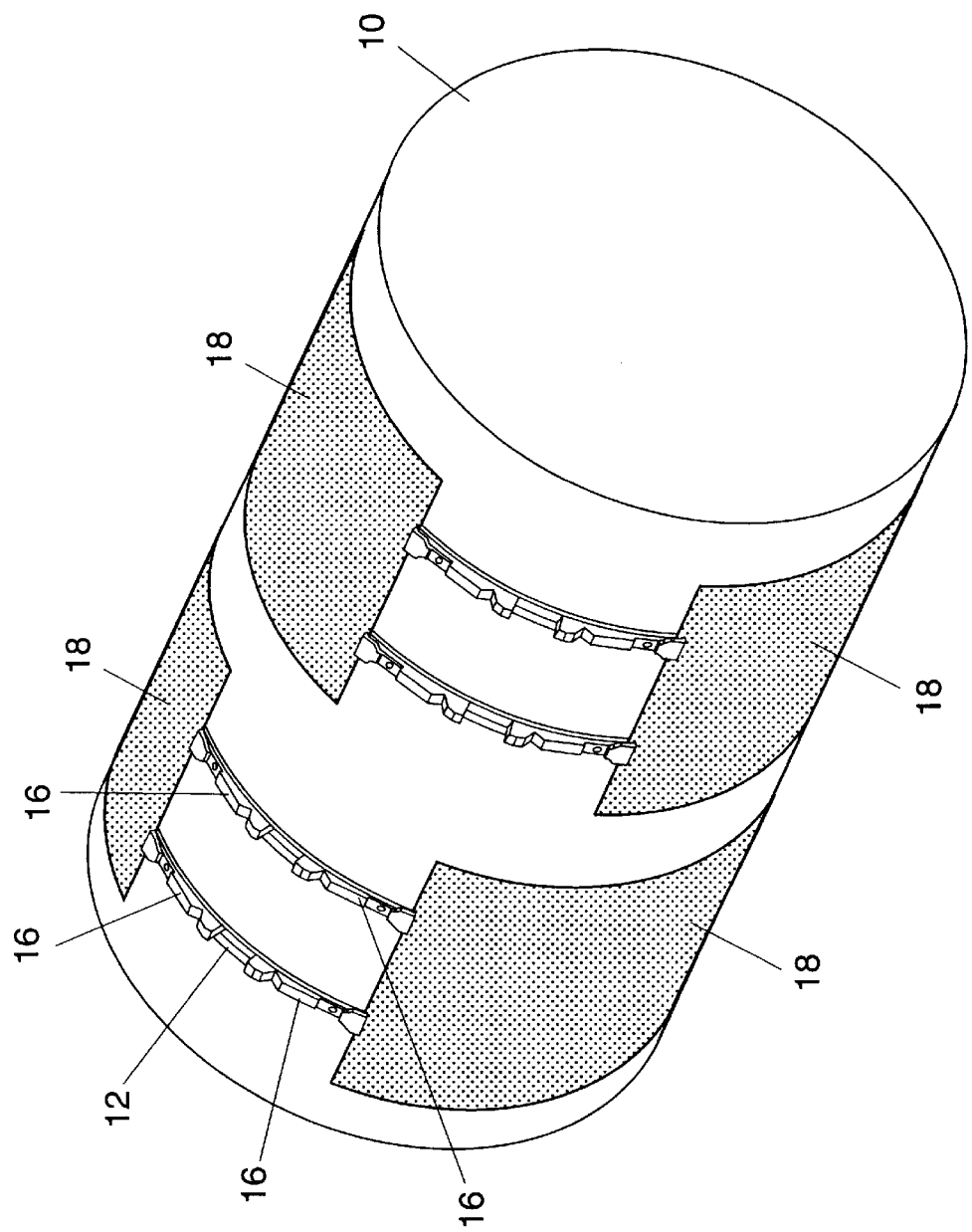
FIG. 10 is an isometric drawing of a system similar to those of FIGS. 8 and 9, showing an arrangement of multiple plates side-by-side.

A variation of the configuration of FIG. 8 is shown in FIG. 9. Here are disposed in each groove around drum 10 two pairs of slidable clamps 50. It is then possible to mount two plates around the drum's circumference, such as plates 18, whereby each plate may independently have any length (subject, of course, to the total of the lengths not exceeding that which can be accommodated between the clamps at maximal intra-pair separation). This configuration advantageously provides a high degree of equipment utilization, while permitting flexibility in plate sizes. It is noted that the two plates may also be of different widths. Furthermore, as with the previously described configurations, it is also possible to mount additional plates side by side, by providing sufficient grooves (at least two per plate across) and corresponding pairs of clamps. Thus, for example and as illustrated in FIG. 10 (where only half of the clamps are viewable), it is possible to mount four plates 18, all of the same or different sizes, in a generally two across by two circumferential arrangement, using eight pairs (or more) of slidable clamps 16 in four (or more) grooves 12. Clearly, the number of pairs of clamps in each groove can also be greater than two—allowing mounting more than two plates circumferentially. It is appreciated that also in the configurations of FIGS. 8 and 9 one set of clamps may be of the stationary type, whereby one slidable clamp in each groove is replaced by a fixed clamp; this case will, however, not manifest the advantage of the flexibility in loading arrangements, explained herebelow.

Figure 14A:
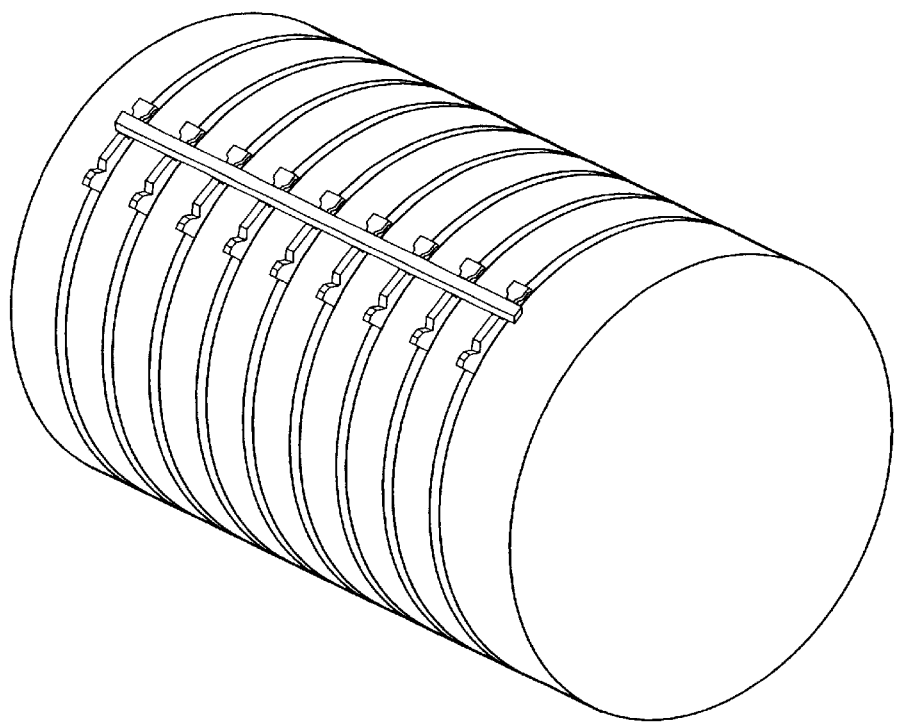
FIGS. 14A and 14B is a schematic isometric drawing of a clamping system, showing additional slidable clamp types.
Figure 14B:
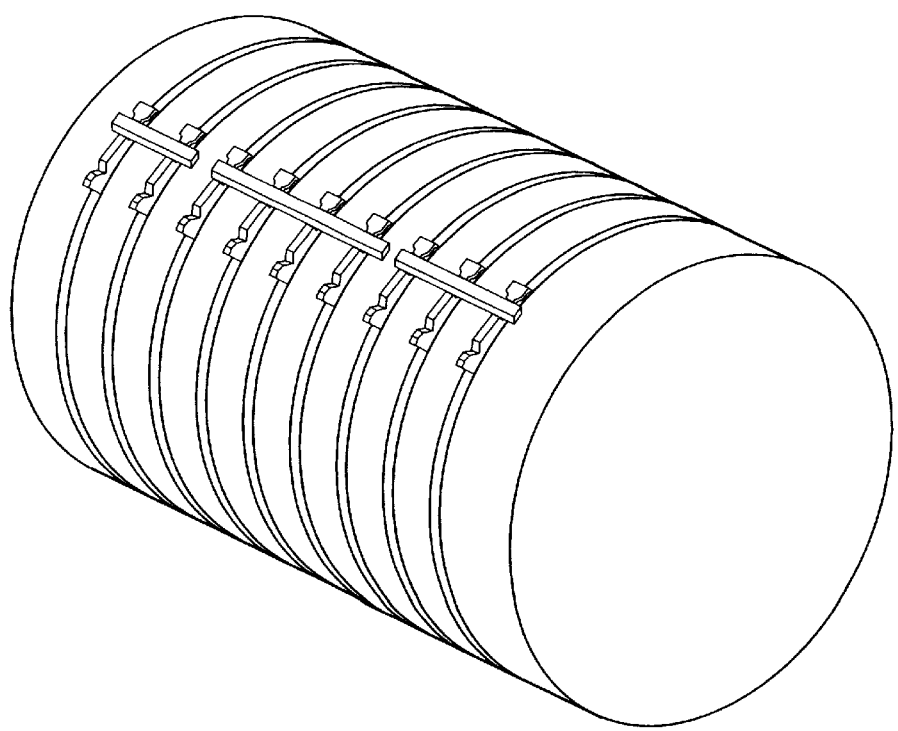

It is noted that the arrangements of slidable clamps discussed hereabove and illustrated in FIGS. 8–10 are also possible if the clamps are not of the dynamic type, as described herein (that is—if the clamping force is not derived from centrifugal action), or of a different dynamic type than that disclosed herein. In other words, any clamps that are movable along respective tracks and fixable at a plurality of positions therealong would enable attaching multiple plates of various sizes and would thus come within the scope of the present invention. Moreover, the clamps need not be isolated clamps, each moving along its own track and operable separately, as described herein, but may, for example, also be grouped into assemblies of clamps, each assembly joined by a bar and moving and operable in common, as sketched in FIG. 14B. Another example of clamps admissible by the present invention is sketched in FIG. 14A, showing a single wide clamp, attached to the drum at a plurality of tracks; alternatively, there may be a plurality of such wide clamps—one for each clampable plate across the drum. It is noted that FIGS. 14A and 14B show only one clamp along each circumferential groove, its matching clamp (as well as circumferentially additional pairs of clamps) being hidden from view. The dynamic slidable clamps disclosed herein, such as clamps 16 in FIGS. 4, are, however, particularly advantageous since they provide strong clamping force at any speed of drum rotation and relatively easy and convenient way of releasing them and of moving them along their grooves, as well as fixing each clamp at any of an infinite number of positions along its track (i.e. groove); furthermore, their being operable individually allows grouping of adjacent clamps to accommodate plates of various widths (whereby, for example, two clamps across would be used for a narrow plate and three or more clamps across for a wider plate).

The operations of mounting and demounting plates on a drum with slidable clamps, and its relation with loading- and unloading stations will now be further explained with reference to FIGS. 11A, 11B, 12A and 12B, which are schematic end views. There is shown schematically in FIGS. 11A and 11B an exemplary arrangement of a plate feeder 72 and a first examplary arrangement of a plate stacker 74, in relation to drum 10 and to activation bar 64, associated with a loading station 71, and to activation bar 64', associated with an unloading station 73. As shown in these views, plate feeder 72 is generally disposed above and to the right of the drum, while plate stacker 74 is below and to the left of the drum. For loading, depicted in FIG. 11A, a plate 18 is fed from feeder 72 (manually or by a mechanism, not shown), extended leftward, tangentially to drum 10, and mounted onto the drum according to the enumerated procedure hereabove. In particular, its leading edge 76 is clamped to drum 10 by a first row of clamps 16, when released by activation bars 64 (steps 4 and 5) and the drum then rotates slowly counterclockwise (step 6) until the plate's trailing edge 78 reaches the vicinity of loading station 71, at which point it is clamped to the drum by a second set of clamps 16', which are slidable (steps 7–10). For unloading, illustrated in FIG. 11B (which is similar to 11A, except that the drum is shown in a different orientation), the second set of clamps, 16', is first brought to unloading station 73, where they are released by activation bar 64', then, through slight CCW rotation of the drum, trailing edge 78 of the plate is freed from the clamps. The drum is then slowly rotated CW, pushing the plate (with its trailing edge, 78, now leading) left toward stacker 74, until the first set of clamps, 16, reaches unloading station 73. At that point the clamps are released, by activation bars 64', and the plate becomes free to be pulled (manually or by a mechanism, not shown) onto stacker 74.

It is noted that in the configuration of FIGS. 11 the first set of dynamic clamps (16) may be of the fixed type, but the second set (16') must be of the movable type. It is further noted that in this configuration the first set of clamps (16) may be of any fixed type, not necessarily of the dynamic type (as described hereabove) and thus would be activatable and releasable by a mechanism other than activation bar 64. This configuration, which is typified by CCW drum rotation during loading and CW rotation during unloading (or vice versa), has some disadvantages for the overall design and operation of the machine, since either the feeder or the stacker may thus be difficult to reach by the machine's operator. In an alternative arrangement of this configuration, the feeder and stacker are placed near each other, e.g. both at the top right, and thus may be more conveniently reachable, but they present mutual space constraints.

An alternative preferable, and generally more advantageous, configuration of plate loading and unloading is such that both operations occur with the drum rotating in the same sense (either CW or CCW). Two exemplary arrangements of this configuration are illustrated in FIGS. 12A and 12B, in both of which plate loader 72 is, again, above and to the right of drum 10. In the arrangement of FIG. 12A stacker 74 is below and to the right of the drum, while in the arrangement of FIG. 12B stacker 74 is above and to the left of the drum. Clamp activation bars 64 and 64' are, again, positioned with respect to their corresponding stations. Under this configuration all dynamic clamps must be of the movable type and are preferably disposed in circumferentially running grooves. Operation is similar for all arrangements. Loading and mounting operation is identical to that under the configuration of FIG. 11A, as described hereabove, using activation bar 64, with plate mounting occurring under CCW drum rotation. However demounting and unloading proceeds as follows: First, the drum is rotated to place the first set of clamps (16) under activation bar 64', which is then activated to keep them open. The drum is then rotated slightly CW, to release leading edge 76 of the plate from under clamps 16. Thereafter, the drum is rotated CCW, letting leading edge 76 of the plate proceed toward stacker 74. When the second set of clamps 16' becomes positioned under activation bar 64' (which is the situation depicted in FIGS. 12A and 12B), the drum stops and the mechanism is activated to release the clamps, whereupon the plate is pulled away to stacker 74.

It is noted that the arrangement of FIG. 12A may be advantageous when it is desirable to access both the loader and the stacker from one side of the machine. The arrangement of FIG. 12B may be advantageous when it is desirable to access both the loader and the stacker from above the machine. The latter arrangement has a further advantage in that a single activation bar may be used for both the mounting and the demounting operations.

It is also noted that, for proper operation of the configuration of FIGS. 12, slidable clamps 16 and 16' need not be mounted in a groove, as in the preferred embodiment, but could be circumferentially movable in any other way; such other ways could also be associated with a clamp activation and release mechanism that is different from activation bar 64 (or 64') and could even be attached to the drum. However, if the extent of such motion is limited, the other advantages of the preferred embodiment, namely the ability to accommodate plates of various lengths, would be lost.

It is further noted that slidable clamps 16 and 16' need not be of the dynamic type (i.e. with clamping force derived from centrifugal action), as described further above or of any other dynamic type, nor need they be activated or released by an activation bar, such as bar 64, to come within the scope of the present invention. However, dynamic slidable clamps, as disclosed herein, are particularly advantageous, since they are of simple design, yet exert strong clamping force and are easily movable during loading and unloading, especially in conjunction with an activation bar as described. It will be appreciated that the configurations described hereabove may be similarly operated for each plate when a plurality of plates are to be mounted on the drum, whether in a circumferential sequence or side-by-side, as described hereabove.

It is still further noted that additional pairs of clamps may be mounted around the drum, such as clamps 17 and 17', shown in FIGS. 11A to 12B. Such clamps may be used to attach additional plates around the drum, using the same respective loading- and unloading mechanisms and procedures as those used with respect to clamps 16 and 16', as described hereabove.

Figure 7:
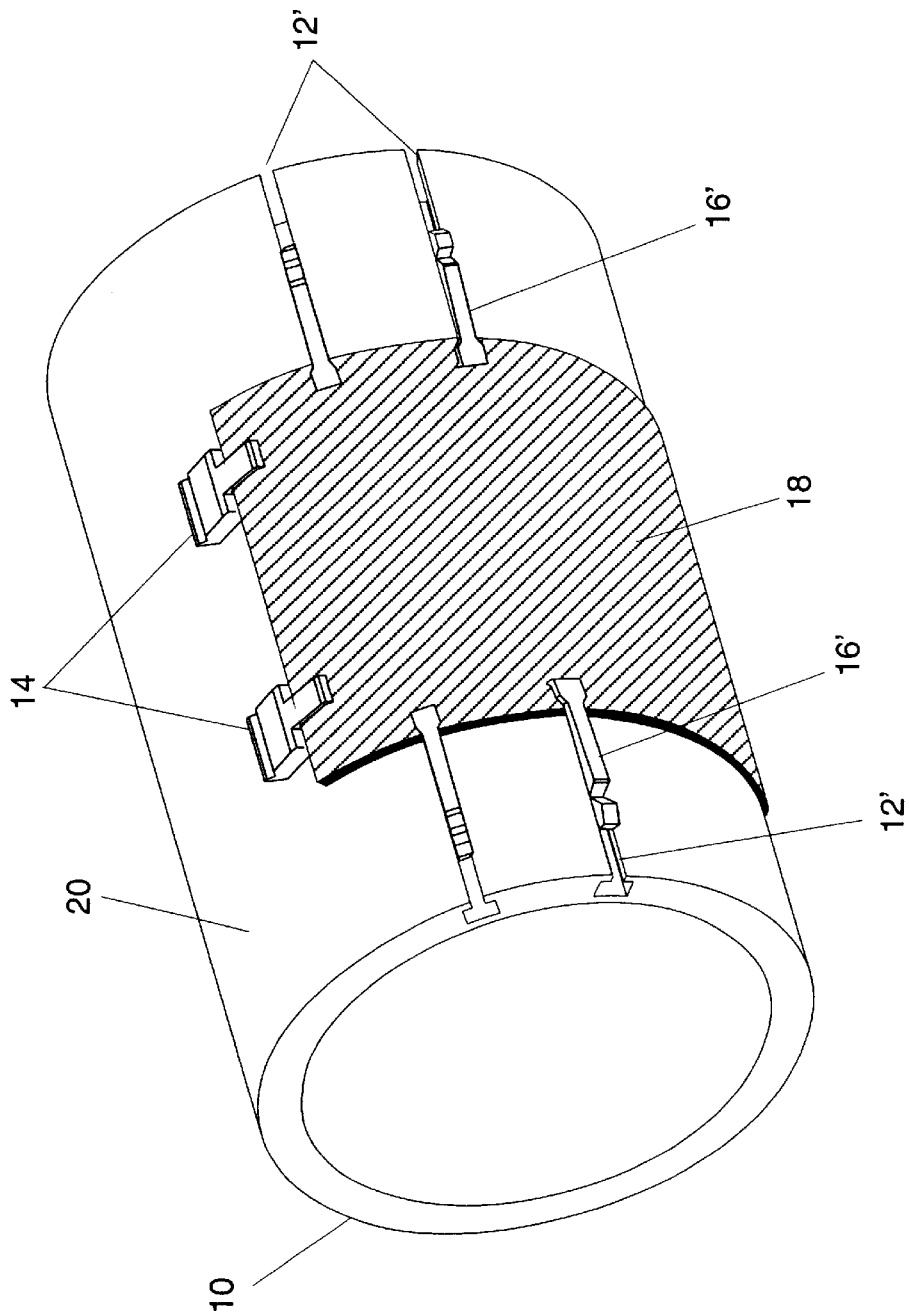
FIG. 7 is an isometric drawing, schematically showing an alternative configuration of the clamping system of the present invention.
Figure 13:
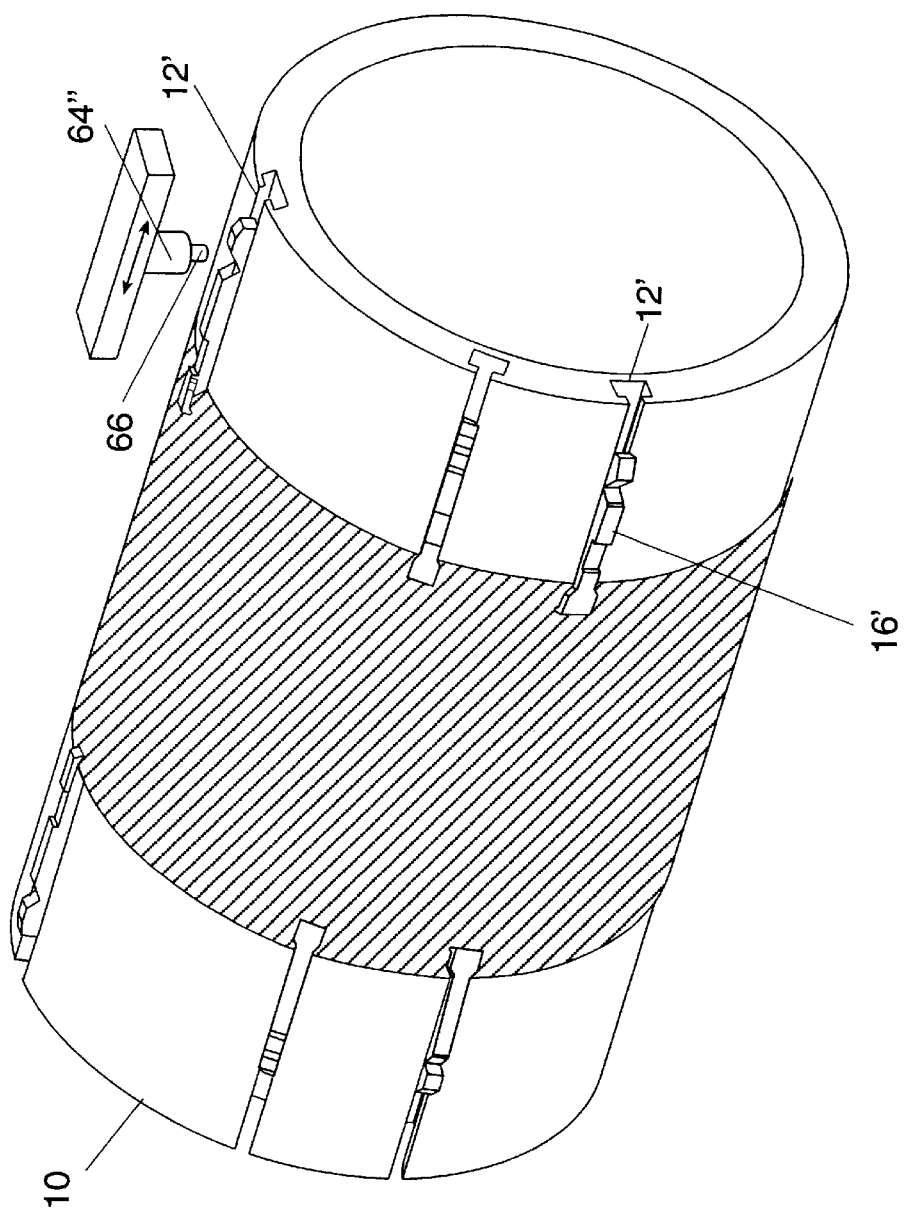
FIG. 13 is an isometric drawing of a clamping system of a configuration alternative to that of FIGS. 8 to 10.

In other alternative configurations of dynamic clamps on the drum, which are basically similar to ones described hereabove, there may be additional clamps, preferably of the slidable type, disposed on the drum so that they can operate to grip a plate 18 along its side edges. A preferred embodiment of such a configuration is illustrated in FIGS. 7 and 13. Here a number of grooves 12', similar to grooves 12, are cut into surface 20 of drum 10 in a direction generally parallel to the drum's axis. Pairs of slidable clamps 16', similar to 16, are mounted in grooves 12', the tips of members of each pair facing each other. One or more plates 18 are mounted on the drum and each held, at one end, by stationary clamps 14 or slidable clamps 16 and, at the other end, by slidable clamps (not shown). Slidable clamps 16' are then operated, in a manner to be described, to grip the side edges of a mounted plate and thus offer additional safety and holding power; they may be particularly advantageous in holding down a plate on a drum that lacks a vacuum system. It is noted that plates of any width (up to nearly the length of the drum) may thus be gripped.

Activation of clamps 16' is effected by means of corresponding activation mechanisms 64", shown in FIG. 13, which are similar to activation bar 64, except that they are movable parallel to the drum's axis. In order to activate several clamps simultaneously, a number of such mechanisms may be disposed at appropriate mutual circumferential distances around the drum. Moving a clamp 16' within its groove is then effected by bringing the corresponding groove (through drum rotation) to under an appropriate pin 66, then moving the respective activation mechanism 64" until its pin 66 engage notch 58 of the appropriate clamp 16', then causing (FIGS. 4) pin 66 to push the body of the clamp and to thus release it and further moving the respective activation mechanism 64", to slide the clamp onto or off the edge of plate 18, as the case may be.

While the invention has been described with respect to a limited number of embodiments, it will be appreciated that many variations, modifications and other applications of the invention may be made.

What is claimed is:

1. Apparatus for recording an image on a flexible plate, the plate having a leading edge and a trailing edge, the apparatus comprising:

a rotatable drum, having an outer cylindrical surface for attaching the plate thereto;

a plurality of circumferential grooves cut into said cylindrical surface;

a plate loading assembly and a plate unloading assembly, both positioned in the vicinity of said drum; and a plurality of clamps, each movable along a respective one of said grooves, said clamps arranged as at least one pair of sets of clamps, each set including at least two of said clamps, all clamps in a first set of each of said at least one pair being operative to clamp the plate at its leading edge onto said cylindrical surface and all clamps in the second set of each of said at least one pair being operative to clamp the plate at its trailing edge onto said cylindrical surface;

and the apparatus being operative to load the plate, leading edge first, from said loading assembly onto said cylindrical surface while said drum rotates in a first direction, and to unload the plate, leading edge first, from said cylindrical surface onto said unloading assembly while said drum rotates in said first direction.

2. The Apparatus of claim 1, being further operative to have only said first set of clamps clamp the plate during loading and only said second set of clamps clamp the plate during unloading.

3. The Apparatus of claim 1, wherein each clamp is switchable between two states—a clamping state and a released state—and movable along a respective one of said grooves while in the released state.

4. The Apparatus of claim 3, further comprising at least one activation mechanism, not attached to said drum and operative to engage any of said clamps, while in an appropriate position, to switch an engaged clamp between said two states, and to cooperate with an engaged clamp, white in a released state, to cause it to slide along the respective one of said grooves in reaction to a rotation of said drum.

5. The Apparatus of claim 4, wherein each of said clamps is a dynamic clamp, whereby the force at which it clamps the plate, when in the clamping state, consists of a constant component and a dynamic component, which is derived from centrifugal action and is essentially proportional to the rotational speed of the drum.

6. The Apparatus of claim 1, wherein said plate loading assembly and said plate unloading assembly are positioned substantially at one and the same side of said drum.

7. The Apparatus of claim 1, wherein said plate loading assembly and said plate unloading assembly are positioned substantially at the same level.

8. The Apparatus of claim 1, wherein any of said clamps is a dynamic clamp, operative to anchor itself to the respective one of said grooves and to clamp the plate to said surface, both operations being with a force that consists of a constant component and a dynamic component, which is derived from centrifugal action and is essentially proportional to the rotational speed of said drum.

9. The Apparatus of claim 1, wherein said at least one pair of sets of clamps is at least two pairs of sets of clamps, the apparatus being further operative to similarly load at least one additional plate from said loading assembly onto said cylindrical surface, thus loaded plates becoming attached to said surface and clamped by respective ones of said clamps in circumferentially tandem positions.

10. The Apparatus of claim 9, wherein said clamps are movable circumferentially so as to accommodate a plurality of plates, each having any of a plurality of lengths.

11. The Apparatus of claim 1, wherein said clamps are movable circumferentially so as to accommodate a plate having any of a plurality of lengths.

* * * * *